United States Patent [19]

Schaeffer

[11] Patent Number: 4,546,697
[45] Date of Patent: Oct. 15, 1985

[54] DRIP COFFEEMAKER HOT WATER GENERATOR

[75] Inventor: Robert L. Schaeffer, Columbia Cross Roads, Pa.

[73] Assignee: Black & Decker, Inc., Newark, Del.

[21] Appl. No.: 657,349

[22] Filed: Oct. 3, 1984

[51] Int. Cl.$^4$ ............................................. A47J 31/00
[52] U.S. Cl. ...................................... 99/279; 99/281; 99/307; 165/84; 219/275; 219/283; 219/302
[58] Field of Search .................. 99/280–283, 99/307, 304, 279; 38/77.82, 77.83; 219/275, 302, 283; 165/84; 426/433

[56] References Cited

U.S. PATENT DOCUMENTS

| | | |
|---|---|---|
| 2,228,004 | 1/1941 | Ewing . |
| 2,318,206 | 5/1943 | Eisenlohr . |
| 2,592,568 | 4/1952 | Hill . |
| 3,165,844 | 1/1965 | Swanke . |
| 3,265,863 | 12/1963 | Bender . |
| 3,455,376 | 7/1969 | Beurtheret . |
| 3,457,990 | 7/1969 | Theophilos . |
| 3,592,125 | 7/1971 | Tolmie . |
| 3,691,934 | 9/1972 | Horn . |
| 4,044,797 | 8/1977 | Fujie et al. . |
| 4,060,126 | 11/1977 | Schladitz . |
| 4,142,840 | 3/1979 | Kemp . |
| 4,271,349 | 6/1981 | Hamon . |
| 4,356,381 | 10/1982 | Flaherty ........................ 99/307 |
| 4,356,382 | 10/1982 | Keramati ....................... 99/307 |
| 4,361,750 | 11/1982 | Miklas . |
| 4,426,920 | 1/1984 | Phillips ........................ 99/307 |

FOREIGN PATENT DOCUMENTS

| | | |
|---|---|---|
| 2316539 | 4/1972 | Fed. Rep. of Germany . |
| 2316254 | 11/1973 | Fed. Rep. of Germany . |
| 6602268 | 2/1966 | Netherlands . |
| 237273 | 11/1924 | United Kingdom . |

Primary Examiner—Robert W. Jenkins
Attorney, Agent, or Firm—Leonard J. Platt

[57] ABSTRACT

An electric drip coffeemaker hot water generator wherein a unique self-cleaning water channel construction is provided in an aluminum casting. A plurality of transverse lands and grooves are formed in the walls of the water channel so that mineral deposits that build up on the lands and grooves and other surfaces of the water channel will crack off or flake away in relatively small chips from differential thermal expansion and contraction. The small chips will be flushed through the channel and into the coffee grounds.

8 Claims, 6 Drawing Figures

DRIP COFFEEMAKER HOT WATER GENERATOR

BACKGROUND OF THE INVENTION

1. Field of the Invention

This invention relates to an electric drip coffeemaker and, more particularly, to an improved hot water generator for such a drip coffeemaker.

2. Description of the Prior Art

In conventional electric drip coffeemakers it is common practice to provide a ground coffee basket positioned above a brewed coffee container and a hot water generator positioned below the brewed coffee container. The hot water generator usually has an upper exposed surface for supporting the brewed coffee container to keep the coffee warm after it has been brewed. The hot water generator also includes a "U" shaped sheathed electric heating element and a complimentary "U" shaped water channel that is positioned immediately adjacent to the sheathed electric heating element for heating water that flows through the "U" shaped channel. The channel has an inlet for cold water and an outlet for the discharge of hot water into the ground coffee basket. One of the problems associated with such hot water generators is fouling of the hot water channel due to the deposition of scale. In hard water areas, in particular, it is very desirable to have a hot water generator which does not clog up with mineral deposits in a short period of time.

SUMMARY OF THE INVENTION

Accordingly, it is a particular object of my invention to provide an improved hot water generator for an electric drip coffeemaker, which cleans itself of mineral deposits and has a longer life.

It is also an object of my invention to provide an improved hot water generator which is constructed to enhance heat exchange efficiency to thereby provide rapid heating of the water delivered to the ground coffee basket.

In accordance with the invention, an electric drip coffeemaker is constructed with a ground coffee basket positioned above a brewed container and a hot water generator which is provided for supplying hot water to the ground coffee basket. The hot water generator includes a metal casting with an electric heating means positioned adjacent to a water channel. One end of the water channel has an inlet for cold water and the other end of the channel has an outlet for the discharge of hot water into the ground coffee basket. The present invention improves on this combination by providing a specific water channel construction including a plurality of transverse lands and grooves formed in the top and side walls of the channel. These grooves and channels are constructed so that the rates of thermal expansion and contraction of adjacent areas of the channel are non uniform.

With this construction, mineral deposits that build up on the lands and grooves and other surfaces of the water channel will crack off or flake away in relatively small chips from the differential thermal expansion and contraction. In addition, the lands and grooves are shaped and constructed to create turbulent water flow. Thus, the small chips will be flushed through the channel and into the coffee grounds. Moreover, the lands and grooves are formed to increase the surface area of the channel that is in contact with the water which is being heated. This enhances heat exchange efficiency that results in rapid heating of the water and faster brewing. Accordingly, by uniquely changing the internal configuration of the casting, an exceedingly simple, self-cleaning, longer life hot water generator with improved heat exchange efficiency and faster brewing has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
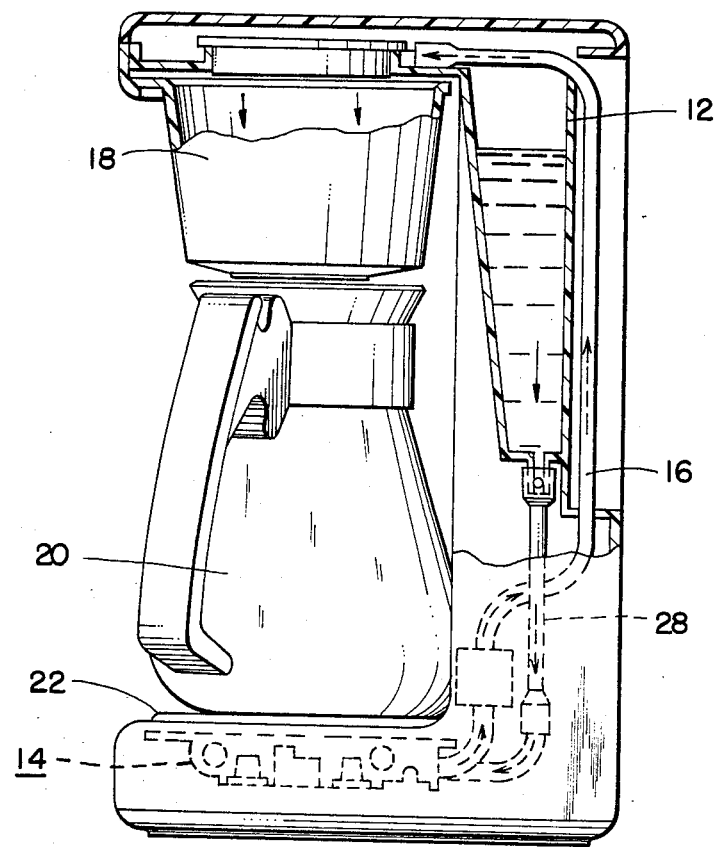
FIG. 1 is a front partially perspective view, partly in sections and phantom of a typical drip coffeemaker employing the invention.
Figure 5:
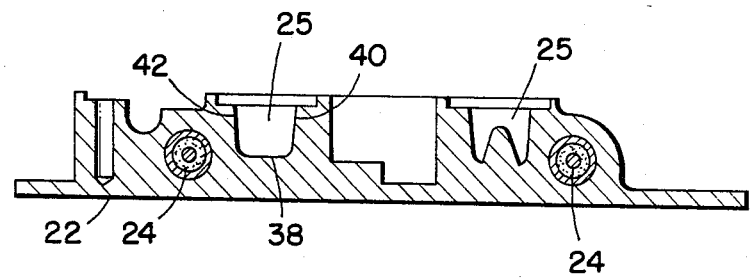
FIG. 5 is a cross sectional view on line 4—4 of FIG. 3.
Figure 2:
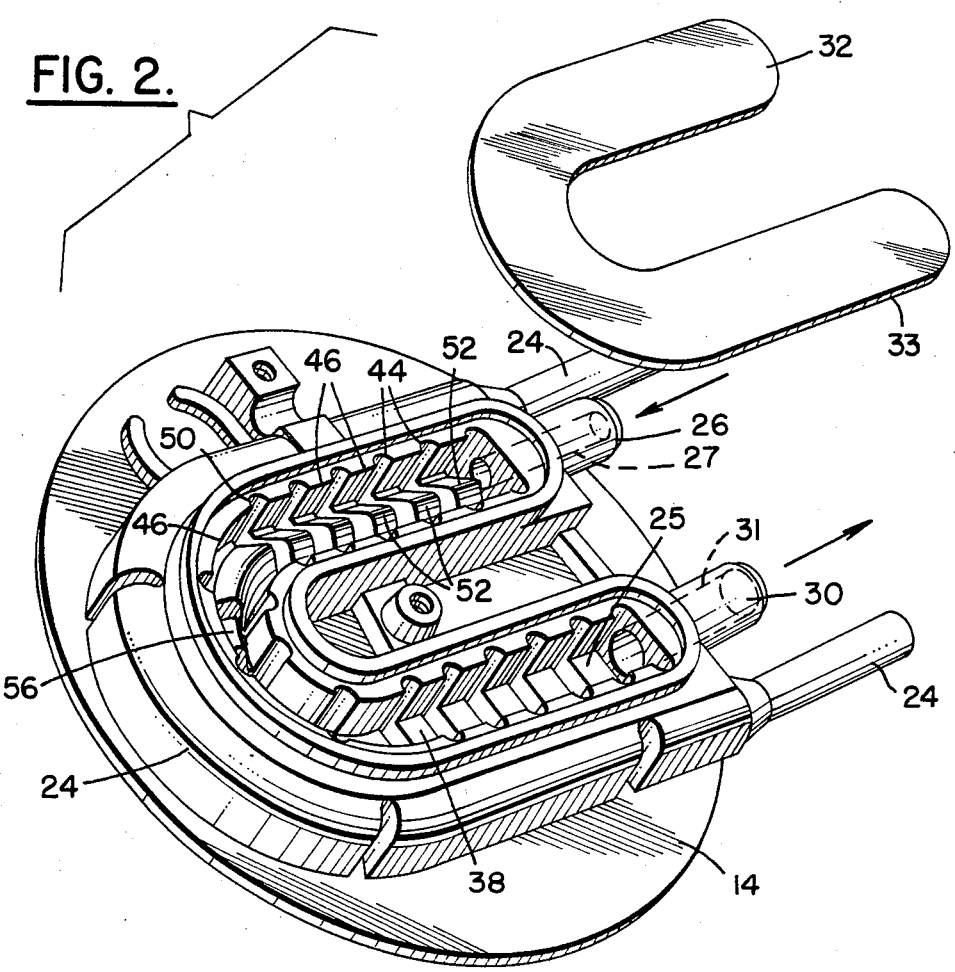
FIG. 2 is an exploded bottom perspective view of my improved hot water generator for such a drip coffeemaker with the cover for the water channel being shown separated from the casting.
Figure 4:
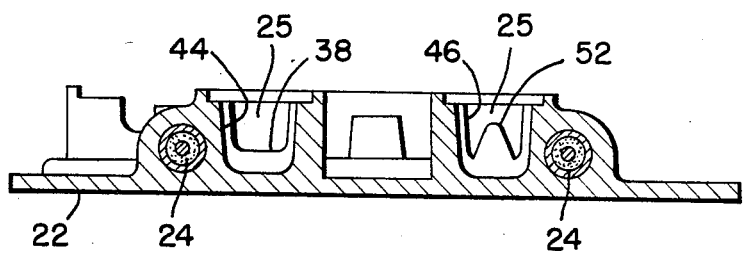
FIG. 4 is a cross sectional view on line 3—3 of FIG. 3.
Figure 3:
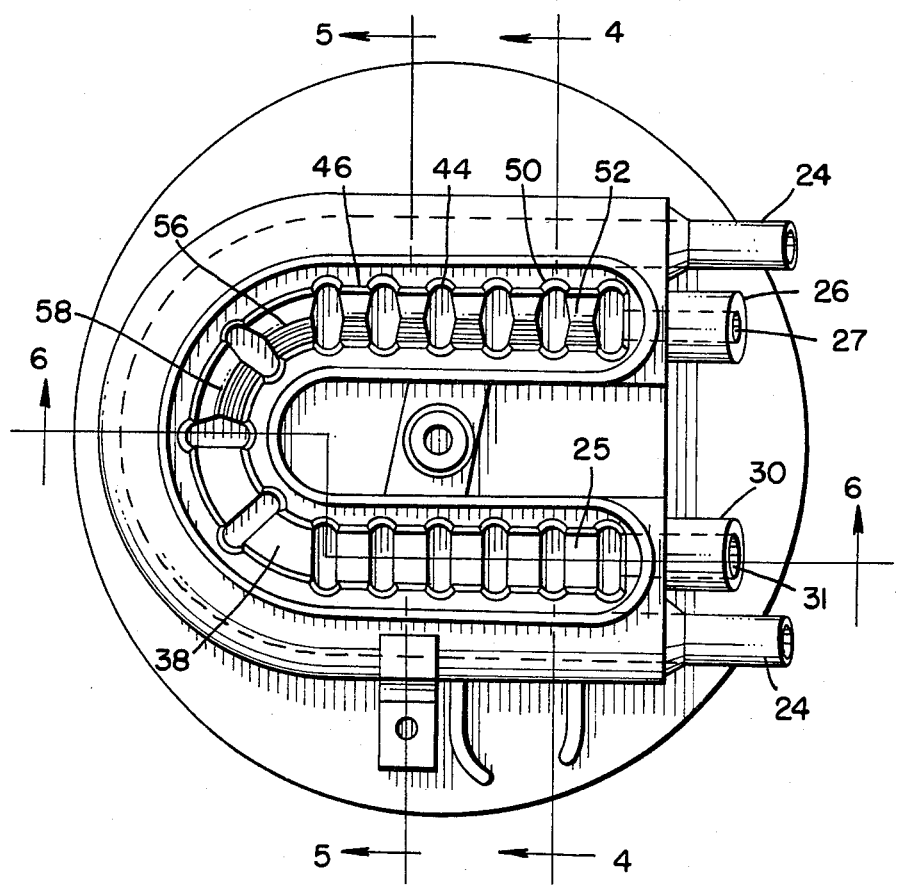
FIG. 3 is a bottom view of the hot water generator shown in FIG. 2 with the cover removed.
Figure 6:
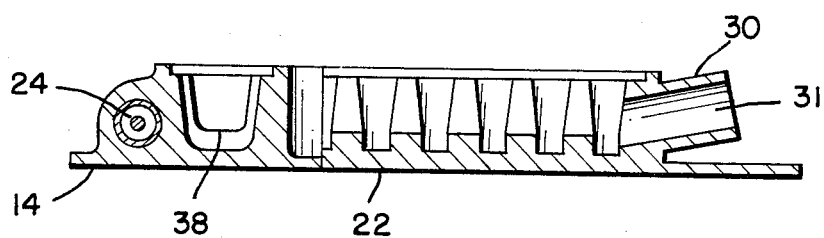

Referring now to the drawing and first particularly to FIGS. 1 and 2, there is shown an electric drip coffeemaker, which includes my improved hot water generator. The coffeemaker includes a container 12 for receiving cold water, a hot water generator 14 for heating the water, conduit means 16 for delivering the hot water to a ground coffee basket 18 and a carafe 20 for collecting brewed coffee. As illustrated, the hot water generator 14 includes an upper surface 22 for supporting the brewed coffee container in order to keep coffee warm after it has been brewed.

The details of the ground coffee basket 18, the water reservoir 12 and the brewed coffee container 20 do not form a part of this invention and are described and illustrated in greater detail in generally similar constructions such as the construction shown in a prior U.S. Pat. No. 4,361,750 to Frank C. Miklus, issued Nov. 30, 1982.

HOT WATER GENERATOR

In accordance with my invention, the hot water generator is constructed so that the rates of thermal expansion and contraction of adjacent areas of its water channel are non uniform to cause mineral deposits that build up on the channel walls to flake off and be readily flushed through the system, thereby making the hot water generator self-cleaning. As shown from the bottom perspective view of FIG. 2 the hot water generator is formed from a conventional aluminum casting 14. The casting conventionally includes a "U" shaped sheathed electric heating element 24 and in the embodiment illustrated my unique water channel construction 25 is "U" shaped and is positioned inwardly from and closely adjacent to the "U" shaped sheathed electric heater 24.

The hot water generator is preferably formed from diecast aluminum and as shown in FIG. 2 it includes a cold water inlet nipple 26 for connection to a conduit 28 that extends to the cold water reservoir 12. In like manner, a hot water outlet nipple 30 is cast for suitable connection to a hot water conduit 16 that extends to the coffee ground basket 18. My unique water channel construction 25 extends from the cold water nipple 26 to the hot water nipple 30 and an aluminum cover 32 is provided for closing the bottom of the water channel by welding or other suitable means. Thus, the water channel 25 includes a top wall 38, an inside wall 40, an outside wall 42 and a bottom wall 33 which is formed in the aluminum cover 32.

The top 38 and side walls 40 and 42 of the water channel are uniquely shaped so that the rates of thermal expansion and contraction of adjacent areas of the channel are non uniform so that mineral deposits that build up on the channel surfaces will crack off or flake away in relatively small chips from differential thermal expansion and contraction and be flushed through the system to the coffee basket. As illustrated in FIG. 2, a plurality of grooves 44 are formed in the upper and side walls of the water channel. These grooves are separated by projecting lands 46 which extend into the water channel to cause a turbulent water flow. As illustrated, the bottom 50 of the grooves 44 are somewhat circular in shape to cause a turbulent water flow and to provide a relatively sharp intersection with the adjacent lands 46. Moreover, the lands 46 near the inlet nipple 28 of the water channel are shaped with downwardly extending, relatively sharp "V" shaped projections 52. These projections 52, not only create great differences in thermal expansion and contraction of the surface of the water channel, but also cooperate with the grooves 44 and their circular bottoms 50 to result in a very turbulent water flow through that area of the water channel, thus enhancing the flaking off of mineral deposits and causing the mineral deposits to be flushed through the system.

As illustrated in FIG. 2 the water channel in the vicinity of the outlet nipple 30 does not include the "V" shaped projections and the outlet nipple 30 may have an internal bore 31 that is larger than the bore 27 of the inlet nipple 26 to facilitate the passage of any mineral deposits that break away from the "V" shaped projections and flow through the outlet nipple 30.

It has been found that the optimum parameters for causing the mineral deposits to be flaked away and washed through the system with a turbulent water action occurs when the depth of the grooves 44 is approximately 0.156 inch, the width of the grooves 44 is approximately 0.188 inch and the width of the lands 46 is approximately 0.188 inch. As illustrated, the "V" shaped projections 56 and 58 at the bight of the "U" are somewhat wider than the "V" shaped projections that are closer to the water inlet nipple 26.

OPERATION

In operation, it can be appreciated that water can be poured into the water reservoir 12 and the water will flow downwardly through the conduit 28 to the water nipple 26 and into my improved hot water generator 14. As the water flows into the hot water generator, it will be caused to swirl somewhat and impact on the downwardly extending "V" shaped projections and the other land portions 46 that are positioned between the grooves 44. As mineral deposits build up on the internal surfaces of the water channel the differential expansion and contraction of the portions of the water channel will cause the mineral deposits to be flaked off. The swirling action will cause them to be flushed through the system. The water channel in the vicinity of the outlet nipple 30 is larger than the water channel in the vicinity of the inlet nipple 26 due to the absence of the downwardly extending "V" shaped projections 52, and thus, any relatively large chips that flake off from the water channel wall surfaces will not be impeded from flowing through the enlarged bore outlet nipple 30.

With this construction, it can be appreciated that the downwardly extending "V" shaped projections 52 and the lands and grooves create an internal surface area which is much larger than an internal surface area without lands, grooves and projections. Thus, the heat exchange efficiency of the system is enhanced, thereby resulting in faster brewing time. More importantly, with this construction, it can be appreciated that I have provided a water channel construction with differential thermal expansion and contraction that causes mineral deposits to be flaked off or broken away from the channel surfaces so that the channel is self-cleaned resulting in a longer life hot water generator.

In view of the foregoing, it can also be appreciated that my unique hot water generator can be easily formed and manufactured at relatively low cost. All of the lands, grooves and projections are readily cast into the aluminum casting at the time it is being formed. Thus, an improved hot water generator construction has been achieved at relatively low manufacturing cost.

What I claim is:

1. In an electric drip coffeemaker wherein a ground coffee basket is positioned above a brewed coffee container and a hot water generator is provided for supplying hot water to the ground coffee basket and wherein the hot water generator includes a metal casting with an electric heating means positioned adjacent to a water channel with one end of the channel having an outlet for the discharge of hot water, the improvement comprising:
   a. a plurality of transverse lands and grooves formed in the walls of said water channel so that the rates of thermal expansion and contraction of adjacent areas of the channel are non uniform to cause mineral deposits that build up on the lands and grooves and other surfaces of the water channel to crack off or flake away in relatively small chips from differential thermal expansion and contraction, said lands and grooves being shaped to create turbulent water flow so that the mineral deposits will be flushed through the hot water generator to the ground coffee basket, said lands and grooves also being constructed to increase the surface area of the channel to enhance heat exchange efficiency that results in faster coffee brewing.

2. An electric drip coffeemaker comprising:
   a. a ground coffee basket for receiving dry ground coffee and heated brewing water;
   b. a metal casting having an upper surface for supporting a brewed coffee container and downwardly extending wall portions for forming a water channel;
   c. a sheathed electric heating element cast into the downwardly extending wall portions of said casting;
   d. a water channel defined by the downwardly extending walls of said casting positioned adjacent to the cast in sheathed electric heating element, said water channel having an inlet for cold water and an outlet for the discharge of hot water to the ground coffee basket and;

e. a plurality of downwardly extending projections formed in the top wall of said water channel so that the rates of thermal expansion and contraction of adjacent areas of the channel are non uniform to cause mineral deposits that build upon the projections and the other surfaces of the water channel to crack off or flake away in relatively small chips from the differential thermal expansion and contraction of the projections and the other surfaces of the water channel flow so that the mineral deposits will be flushed through the water channel and into the ground coffee basket.

3. An electric drip coffeemaker comprising:
   a. a ground coffee basket for receiving dry ground coffee and heated brewing water:
   b. a metal casting having an upper surface for supporting a brewed coffee container and downwardly extending wall portions for forming a water channel;
   c. a "U" shaped sheathed electric heating element cast into the downwardly extending wall portions of said casting;
   d. a "U" shaped water channel defined by the downwardly extending walls of said casting positioned adjacent to the cast in sheathed electric heating element, said water channel having an inlet for cold water and an outlet for the discharge of hot water to the ground coffee basket and;
   e. a plurality of downwardly extending "U" shaped projections formed in the top wall of said water channel so that the rates of thermal expansion and contraction of adjacent areas of the channel are non uniform to cause mineral deposits that build up on the projections and the other surfaces of the water channel flow so that the mineral deposits will be flushed through the water channel and into ground coffee basket.

4. An electric drip coffeemaker comprising:
   a. a ground coffee basket for receiving dry ground coffee and heated brewing water;
   b. a metal casting having an upper surface for supporting a brewed coffee container and downwardly extending wall portions for forming a water channel;
   c. a sheathed electric heating element cast into the downwardly extending wall portions of said casting;
   d. a water channel defined by the downwardly extending walls of said casting positioned adjacent to the cast in sheathed electric heating element, said water channel having an inlet for cold water and an outlet for the discharge of hot water to the ground coffee basket;
   e. a plurality of projections extending downwardly from the top wall of said water channel adjacent to the inlet for cold water so that the rates of thermal expansion and contraction of adjacent areas of the channel are non-uniform to cause mineral deposits that build up on the projections and the other surfaces of the water channel to crack off and flake away in relatively small chips from the differential thermal expansion and contraction of the projections and the other surfaces of the water channel creating turbulent water flow so that the mineral deposits will be flushed through the water channel and into the ground coffee basket.

5. An electric drip coffeemaker comprising:
   a. a ground coffee basket for receiving dry ground coffee and heated brewing water;
   b. a metal casting having an upper surface for supporting a brewed coffee container and downwardly extending wall portions for forming a water channel;
   c. a sheathed electric heating element case into the downwardly extending wall portions of said casting;
   d. a water channel defined by the downwardly extending walls of said casting positioned adjacent to the cast in sheathed electric heating element, said water channel having an inlet for cold water and an enlarged outlet for the discharge of hot water to the ground coffee basket and;
   e. a plurality of "V" shaped projections extending downwardly from the top wall of said water channel adjacent to the inlet for cold water, the water channel adjacent to said outlet being free from said "V" shaped projections, so that the rates of thermal expansion and contraction of adjacent areas of the channel are non-uniform to cause mineral deposits that build up on the projections and the other surfaces of the water channel to crack off or flake away in relatively small chips from the differential thermal expansion and contraction of the projections and the other surfaces of the water channel creating turbulent water flow so that the mineral deposits will be flushed through the portion of the water channel that is free from said "V" shaped projections through the enlarged outlet and into the ground coffee basket.

6. An electric drip coffeemaker comprising:
   a. a ground coffee basket for receiving dry ground coffee and heated brewing water;
   b. a metal casting having an upper surface for supporting a brewed coffee container and downwardly extending wall portions for forming a water channel;
   c. a sheathed electric heating element cast into the downwardly extending wall portions of said casting;
   d. a water channel defined by the downwardly extending walls of said casting positioned adjacent to the cast in sheathed electric heating element, said water channel having an inlet for cold water and an outlet for the discharge of hot water to the ground coffee basket;
   e. a plurality of transverse grooves separated by complimentary transverse lands formed in the top and side walls of said water channel so that the rates of thermal expansion and contraction of adjacent areas of the channel are non-uniform to cause mineral deposits that build up on the lands and grooves and the other surfaces of the water channel to crack off or flake away in relatively small chips from the differential thermal expansion and contraction of the lands and grooves and other surfaces of said water channel creating turbulent water flow so that the mineral deposits will be flushed through the water channel and into the ground coffee basket.

7. An electric drip coffeemaker comprising;
   a. A ground coffee basket for receiving dry ground coffee and heated brewing water;
   b. a metal casting having an upper surface for supporting a brewed coffee container and downwardly extending wall portions for forming a water channel;

c. a sheathed electric heating element cast into the downwardly extending wall portions of said casting;

d. a "U" shaped water channel defined by the downwardly extending walls of said casting positioned adjacent to the cast in sheathed electric heating element, said water channel having an inlet for cold water and an outlet for the discharge of hot water to the ground coffee basket;

e. a plurality of transverse grooves separated by complimentary transverse lands formed in the top and side walls of said water channel and;

f. a plurality of downwardly extending "V" shaped projections formed in said casting with the transverse lands that are located pear the inlet of the water channel so that the rates of thermal expansion and contraction of adjacent areas of the channel are non-uniform to cause mineral deposits that build up on the lands and grooves, "V" shaped projections and the other surfaces of the water channel to crack off or flake away in relatively small chips from the differential thermal expansion and contraction of the lands and grooves and the "V" shaped projections creating turbulent water flow so that the mineral deposits will be flushed through the water channel and into the ground coffee basket.

8. An electric drip coffeemaker as defined in claim 7, wherein the depth of the grooves is approximately 0.156 inch, the width of the grooves is approximately 0.188 inch and the width of the lands is approximately 0.188 inch in order to enhance differential thermal expansion and the flaking off of mineral deposits that build up on the lands and grooves and the adjacent areas of the water channel.

* * * * *